G. F. ROYER.
FLEXIBLE PIPE COUPLING.
APPLICATION FILED JAN. 16, 1907. RENEWED AUG. 13, 1908.
916,025.
Patented Mar. 23, 1909.
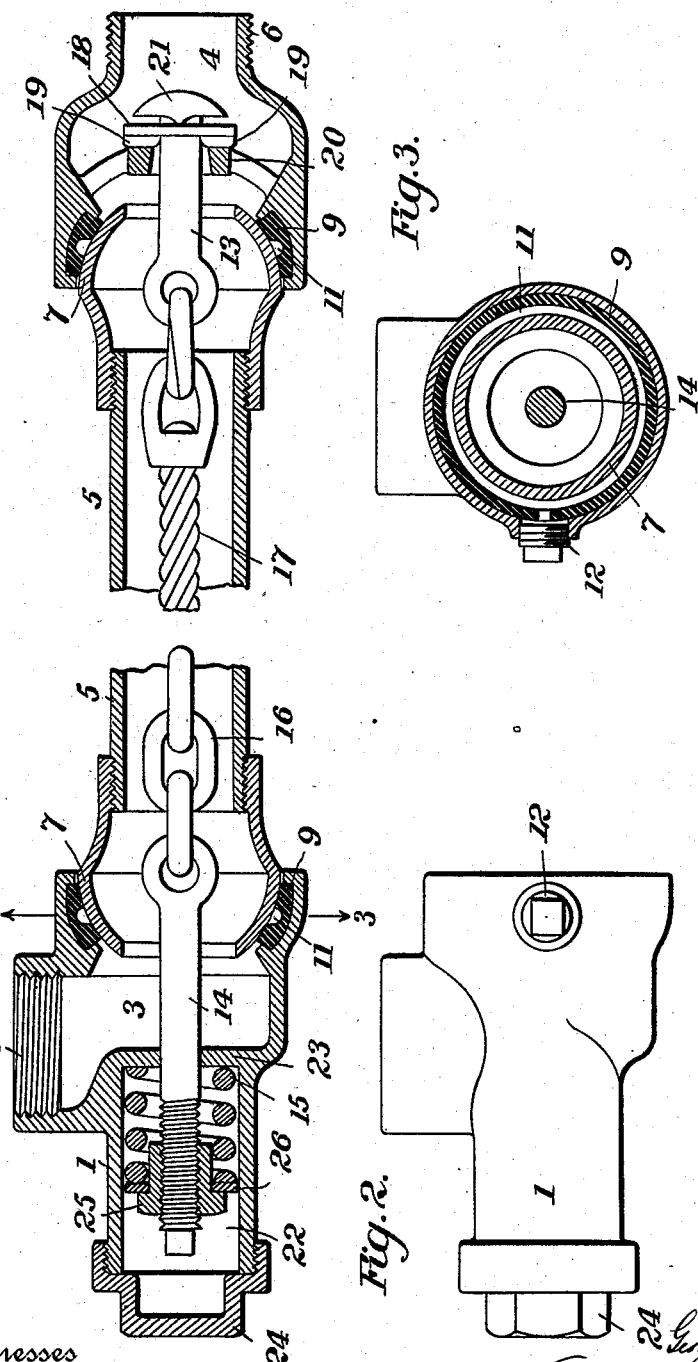

UNITED STATES PATENT OFFICE.

GEORGE F. ROYER, OF WILKES-BARRE, PENNSYLVANIA.

FLEXIBLE PIPE-COUPLING.

No. 916,025.    Specification of Letters Patent.    Patented March 23, 1909.

Application filed January 16, 1907, Serial No. 352,649. Renewed August 13, 1908. Serial No. 448,381.

*To all whom it may concern:*

Be it known that I, GEORGE F. ROYER, a citizen of the United States, and a resident of Wilkes-Barre, county of Luzerne, and State of Pennsylvania, have invented certain new and useful Improvements in Flexible Pipe-Couplings, of which the following is a specification.

The present invention relates to improvements in flexible pipe couplings and has for its principal object to provide a coupling which will be especially adapted for connecting the pipes of the fluid pressure brake system or steam heating system employed on railway trains.

In the accompanying drawing: Figure 1 is a longitudinal sectional view through a coupling constructed in accordance with the invention; Fig. 2 is an elevation of one of the coupling heads; Fig. 3 is a transverse sectional view, on the line 3—3 of Fig. 1.

Referring to the drawing, it will be seen that the coupling comprises two heads 1, 2, in which are respectively formed fluid passages, 3, 4 and an intermediate sleeve 5 which is connected by suitable ball and socket joints with said heads, the parts being held together by a flexible connection extending from one head to the other and passing through the sleeve.

As shown, the heads 1, 2 are each provided with a threaded section 6, by means of which they may be connected to the pipes to be joined, and the enlarged, semi-spherical members 7 of the ball and socket joints between the sleeve 5 and said heads extend into suitable seats formed at one end of the fluid passages 3, 4. Within said seats and surrounding the ball members 7 are arranged suitable packing rings 9 in the inner face of each of which is formed an annular groove 11 that communicates with a duct extending through the coupling head and normally closed by a removable plug 12. Through such duct and channel 11 any necessary lubricant may be readily applied to the ball and socket joint between the sleeve 5 and coupling head.

The coupling heads are connected by a flexible connection extending through the sleeve 5 and comprising two coupling pins 13, 14, engaging respectively the head 2 and a spring 15 in the head 1, and being themselves connected either by a chain 16 or a section of wire rope or cable 17. The pin 13 extends through an aperture in a plate or disk 18, which is provided on one face with V-shaped or knife-edge bearing lugs 19 that rest against a spider 20 within the head 2, and the head 21 of said pin is provided with a similar bearing against the plate 18. It will be seen that the bearings between the spider 20 and plate 18, and between the latter and the pin 13, extend at right angles to each other, thus securing a maximum amount of freedom of motion between the head 2 and the connecting means.

An important feature of the present invention is that the spring 15 is not arranged within the fluid passage through the coupling, but is entirely within a chamber 22 formed in the head 1, at one side of and independent of the passage 3 therein, from which it is separated by a partition 23. The chamber 22 extends through the outer face of the coupling head, being closed at that end by a removable cap 24.

The coupling pin 14 extends through an aperture in the partition 23 and into the chamber 22, the end thereof within said chamber being threaded and surrounded by the spring 15. A nut 25 is screwed upon said threaded end of the pin 14 and forces a disk 26 against the outer end of the spring. By means of said nut the extent of compression of the spring may be readily varied to suit the particular conditions under which the coupling is to be employed.

The operation and advantages of the coupling will be readily understood and appreciated. By arranging the spring 15 within a separate and independent chamber and not in the fluid passage, it is protected from the fluid passing through the coupling and the tension thereof may also be readily varied if desired, without disconnecting any member of the coupling. By this arrangement the spring may act as a governor or regulator for controlling the pressure within the coupling and pipes connected thereby. For example if it is desired that the fluid pressure within the system shall not exceed say 60 pounds, the nut 25 may be adjusted to cause the spring to exert such force on the coupling that the members thereof will be held in close connection and the ball and socket joints between the sleeve and coupling heads will be fluid tight. If, however, the pressure should be increased above that desired, the force of the spring will be overcome and the coupling members allowed to separate and the fluid passage thereby brought into communication with the atmosphere.

Having thus described the invention, what is claimed is:

1. The herein described flexible pipe coupling comprising two heads, each provided with a fluid passage, a sleeve arranged between said heads and connecting the fluid passages therein, and a flexible connection between said heads and extending through said sleeve, said connection including a spring which is arranged outside of the fluid passage through the coupling.

2. The herein described flexible pipe coupling comprising two heads adapted to be respectively engaged with and form continuations of the pipes to be connected, a sleeve having its ends extending into said heads, a spring arranged within a chamber formed in one of said heads and separated from the fluid passage through said head, and means connected at one end with said spring and at the other end with the other coupling head.

3. The herein described flexible pipe coupling comprising two heads adapted to be engaged with the pipes to be connected and each having a fluid passage extending through it, a sleeve arranged between and connecting the fluid passages in said heads, one of said heads having formed therein a chamber which is separated from the fluid passage by a transverse partition, a spring arranged within said chamber, and means extending through the intermediate sleeve and connecting said spring with the other coupling head.

4. The herein described flexible pipe coupling comprising two heads adapted to be engaged with the pipes to be connected and each having a fluid passage extending through it, a sleeve arranged between and connecting the fluid passages in said heads, a spring within one of said heads, an apertured plate mounted to rock within the other head, a coupling pin extending through said plate and having at one end a head bearing thereon to rock about an axis at right angles to that on which the plate rocks, and means connecting said pin with the spring in the other head of the coupling.

5. The herein described flexible pipe coupling comprising two heads, each provided with a fluid passage, a sleeve connected by ball and socket joints with said heads and forming a continuation of the fluid passages therein, a flexible connection between said heads including a spring arranged within a chamber formed in one of the heads and independent of the fluid passage, and means within said chamber for adjusting the tension of said spring.

6. The herein described flexible pipe coupling comprising two heads each having a fluid passage therethrough, and one of said heads having formed therein at one side of its fluid passage a chamber that opens through the outer face of the head, a sleeve connecting the fluid passages in the heads, a coiled spring arranged within said chamber in one of the coupling heads and bearing against the portion of the head that separates said chamber from the fluid passage in the head, a coupling pin extending through the spring and the partition separating said chamber from the fluid passage, and provided with means for engaging the outer end of the spring, and means connecting said pin with the other coupling head.

7. In a pipe coupling, the combination of two heads, a sleeve arranged between and having its ends extending into seats in said heads, means connecting said members and permitting free rotary movement of the heads relative to the sleeve, each having formed therein a duct that extends from the outer surface thereof to the seat for the end of said sleeve, and a packing ring arranged within each of said seats about the sleeve and having formed in its inner face a groove or channel that communicates with the aforesaid duct in the head.

In testimony whereof I affix my signature in presence of two witnesses.

GEORGE F. ROYER.

Witnesses:
JOHN Y. O'DONNELL,
EDWARD N. NOLL.